United States Patent [19]

Nakashima

[11] 4,420,447
[45] Dec. 13, 1983

[54] PROCESS FOR PRODUCING FOAM MOLDINGS WITH AN INSERT

[75] Inventor: Akira Nakashima, Komaki, Japan

[73] Assignee: Tokai Chemical Industries, Ltd., Komaki, Japan

[21] Appl. No.: 337,171

[22] Filed: Jan. 5, 1982

[30] Foreign Application Priority Data

Jan. 16, 1981 [JP] Japan ................................. 56-5806

[51] Int. Cl.³ ............................................. B29D 27/04
[52] U.S. Cl. .................................. 264/46.4; 249/172; 264/46.5; 264/46.7; 264/46.8; 264/161; 425/817 R
[58] Field of Search .................... 264/46.5, 45.5, 46.4, 264/46.8, 46.7, 161; 249/172; 425/817 R

[56] References Cited

U.S. PATENT DOCUMENTS

| | | |
|---|---|---|
| 2,944,170 | 7/1960 | Knapp et al. ................. 264/46.5 X |
| 3,091,946 | 6/1963 | Kesling ......................... 264/46.8 X |
| 3,150,796 | 9/1964 | Hocking et al. ............... 264/46.5 X |
| 3,467,741 | 9/1969 | Kesling ......................... 264/46.5 X |
| 3,795,722 | 3/1974 | Sassaman ...................... 264/161 X |
| 3,816,837 | 6/1974 | Smith ............................ 264/46.5 X |
| 4,043,022 | 8/1977 | Kisuna et al. ................. 264/46.5 X |
| 4,228,115 | 10/1980 | Gardner ........................ 264/45.5 X |

*Primary Examiner*—Philip E. Anderson
*Attorney, Agent, or Firm*—Browdy and Neimark

[57] ABSTRACT

Process for producing foam moldings with an insert executed in a mold for foam molding consisting of a core block and a cavity block. The process comprises steps of: (a) having a film adhering to and covering the insert on one side thereof where a foam layer is formed; (b) letting the skirt portion of the film to be pinched or sandwiched by the uniting portion of the two blocks while the foaming process is executed on a foamable material; and (c) forming integrally the foam layer on that side of the insert, with the film being retained between the insert and the foam layer to be obtained.

10 Claims, 13 Drawing Figures

PROCESS FOR PRODUCING FOAM MOLDINGS WITH AN INSERT

FIELD OF THE INVENTION

This invention relates to a process for producing foam moldings with an insert, and more particularly to a method capable of effectively preventing, in the course of manufacturing foam moldings with an insert, ingress or incursion of foamable material to the back side of the insert.

BACKGROUND OF THE INVENTION

Foam moldings with an insert, which have been widely used in the field of interior automobile parts or members such as pads, for example safety pads (crash pads), cushions, glove compartment doors, and the like, are usually composed of an insert of a predetermined shape, as a reinforcing member or an attaching member to a member to which it should be fixed, and a foam layer formed on one side of the insert with a predetermined thickness.

Foam moldings with an insert of this category are usually made by setting an insert of predetermined shape in a cavity, formed in a mold for foam-molding which is composed of a cavity block and a core block functioning as a cap or hood for the former, and letting predetermined foaming or foamable material to be poured into the cavity to foam there. Difficulty of close and physically perfect contact between the insert and the mold causes sometimes ingress of the foamable material such as polyurethane forming composition to the back side of the insert where the foam layer is not formed. This phenomenon so-called polyurethane leakage frequently produces burrs or flashes on the back side of the insert. Such burrs must be removed at a particularly required place or places where the insert is attached to a counterpart member. Such leakage of the foamable material causes sometimes ununiform foaming, formation of void or hollow places, ununiform strength of the foam layer, etc., which increases the ratio of inferior goods. As the insert is, from the view point of its function, made of a material suitable for being well adhered by the foamable material such as polyurethane premix when foaming takes place, the removing of the produced burrs becomes difficult all the more. It therefore provides another inherent problem, for example, in glove compartment doors where even the rear side of the finished article requires good appearance the insert must be supplied with a back-cover for the better appearance thereof.

Another problem incurred from the leakage of the foamable material to the back side of the insert is deterioration of mold release, that is, separation of the insert from the mold. As this inferior mold release causes occurrence of inferior goods due to deformation of the products, frequent use of mold releaser agent is consequently necessitated. As to the leakage of the foamable material through holes necessarily formed in the insert, various patchworks have been attempted such as plastering a tape thereon. Coating of the mold release agent, plastering of the tape, etc., are not fundamental for solving of the foamable material leakage problem, but on the contrary liable to raise the production coast of the goods through the additional processes or steps required thereby.

SUMMARY OF THE INVENTION

It is an object of this invention, which was made from such a background, to provide an improved process or method for producing foam moldings with an insert.

It is another object of this invention to provide an improved process for producing foam moldings with an insert, by effectively eliminating imperfect foaming of foamable materials and production of unsightly articles through prevention of the foamable material from ingress to the back side of the insert.

It is another object of this invention to provide an advantageous process of manufacturing interior automobile parts or members such as pads, e.g., safety pads; cushions; glove compartment doors and the like.

Other objects and advantages of the invention will be apparent from the following detailed description of a specific embodiment of the invention which is described with reference to the accompanying drawings.

For achieving those objects the invented method characteristically comprises steps of (a) forming a film adhered to one surface of an insert, which is to be set within a cavity formed in a mold for foam-molding, on the side where a foam layer is made, and (b) letting the peripheral or skirt portion of the film to be pinched or sandwiched by the uniting portion of the two blocks constituted the mold while a predetermined foamable material is being foamed, so as to integrally foam the foam layer on one side of the insert, with the film being placed inbetween. The insert which is set on the mold can serve the foaming process in a substantially wholly covered status by a film, so that ingress of the foamable material to the back side of the insert, that is, between one block of the mold and the insert, can never take place, even when there are some holes or openings in the insert, or when the insert is not completely closely contacted with the inner surface of one block of the mold. It has perfectly eliminated inferior foaming and production of unsightly articles caused by leakage of the foamable material.

BRIEF DESCRIPTION OF THE DRAWINGS

FIGS. 11–13 are for showing another example of this invention, in which:

FIG. 11 is a vertical sectional view of a mold corresponding to that in FIG. 7 wherein pouring of the foamable material into the mold is illustrated;

FIG. 12 is an enlargement of A portion in FIG. 11; and

FIG. 13 is a vertical sectional view of a mold corresponding to that in FIG. 8 wherein completion of the foaming process is illustrated.

DETAILED DESCRIPTION OF THE PREFERRED EMBODIMENTS

The invention will be described further in detail, taking up some preferred embodiments, with reference to the appended drawings.

Figure 1:
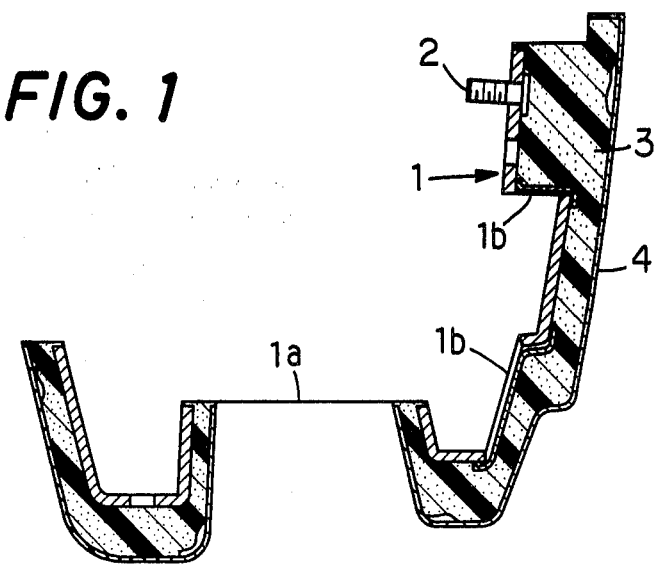
FIG. 1 is a vertical sectional view for explaining a traditional safety pad.

Prior to entering the explanation of this invention a safety pad, as an example of the interior automobile parts or members, will be commented for better understanding of the invention. In an insert 1, as shown in FIG. 1, there are provided a bolt(s) 2 and a not-shown boss(es) for the purpose of attaching or fixing the insert to a counterpart thereof, or a member to which the same should be attached. There are provided further therein an opening 1a for the final use of the same and a hole 1b formed at the time of injection molding of the insert itself. On one side, called front, thereof a foam layer 3 with a predetermined thickness is formed by means of a foaming process, and an outer layer or skin (sheet) 4 is formed on the outer surface of the foam layer 3 before the insert 1 is finished.

Figure 2:
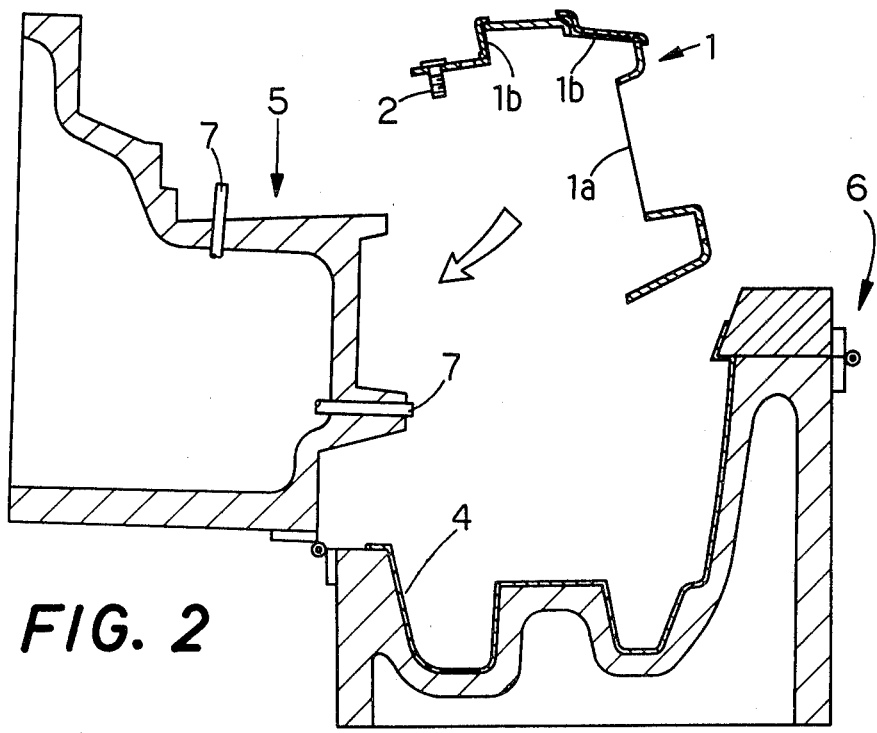
FIGS. 2 to 5 are respectively a vertical sectional view showing a traditional manufacturing process of a safety pad in succession.
Figure 3:
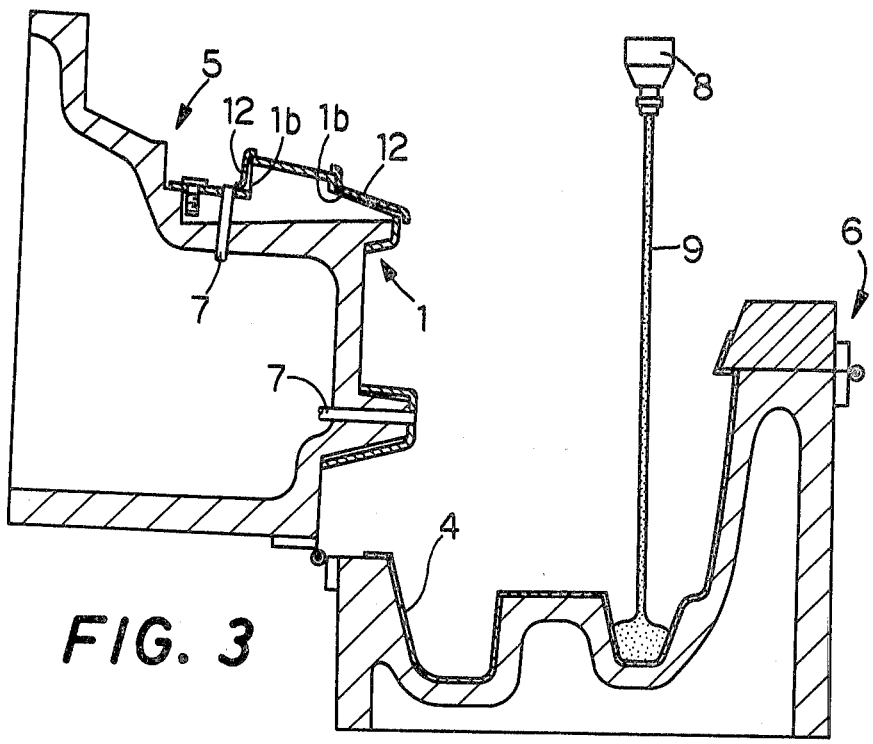
Figure 4:
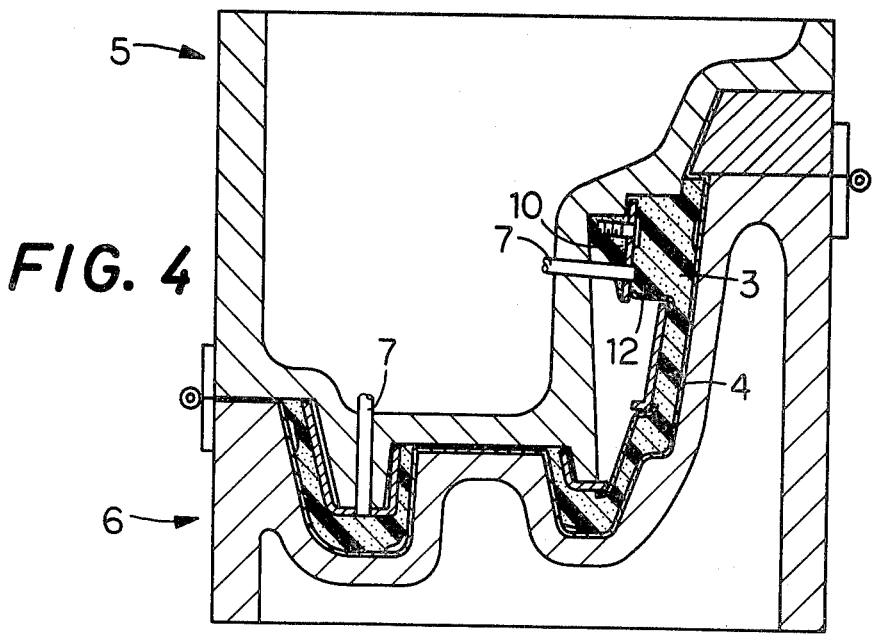
Figure 5:
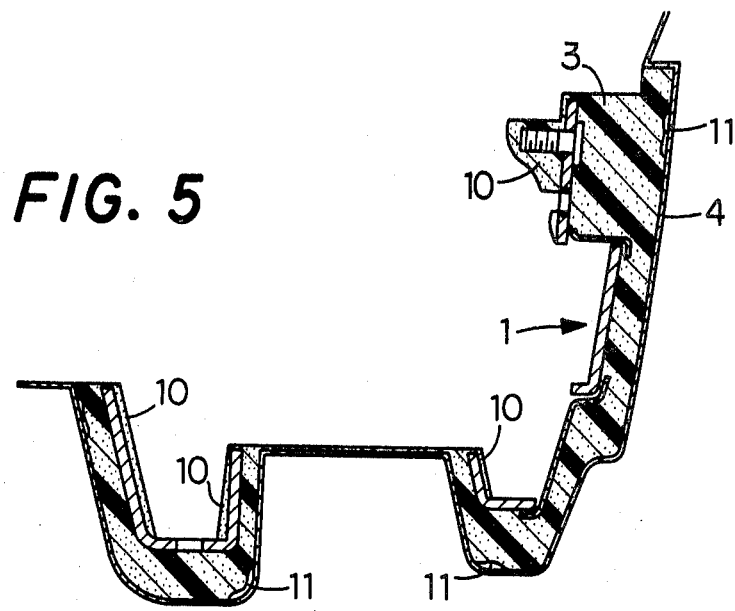

A safety pad as a foam molding or foaming with an insert has traditionally been manufactured by a process or a method continuously illustrated in the drawing from FIG. 2 through FIG. 5. In a cavity block 6, which is a counterpart of a core block 5 in a mold for foaming operation, a skin sheet 4 prepared beforehand as a material is set. On the other hand, in the core block 5, functioning as a cover member for the cavity block 6, an insert 1 is temporarily fixed with a detachable pin 7 or the like for being set as shown in FIG. 2. Then a formable material 9, such as polyurethane forming or premix composition comprising polyisocyanate component and polyol component, is poured into the mold from a mixing head or pouring apparatus 8 as shown in FIG. 3, followed by closing of the mold between the cavity block 6 and the core block 5 and performing of the foaming reaction or curing in an oven under a temperature in the range, for example, between 40° C. and 60° C. (see FIG. 4). Through a series of those steps a finished article of the safety pad shown in FIG. 5 is obtained.

In this process of foam molding, however, the ratio of inferior goods or articles is inherently high, to a great disadvantage, because of incomplete physical close contact between the insert 1 and the core block 5, which is accompanied by the problematic polyurethane leakage. This leakage of polyurethane causes in turn taking place of burrs 10 on the back side of the insert 1 as shown in FIG. 5, ununiformity of foaming, producing of holes or voids 11 in the foam layer 3 as shown in FIG. 5, ununiformity of strength of the foam layer 3, etc. The leakage of the polyurethane material to the back side of the insert 1 further deteriorates mold release between the insert 1 and the core block 5, as another problem, which naturally increases inferior articles through deformation and unsightly appearance of the products. Still another problem is too much applying of mold release agent on the inside surface of the cavity of the mold.

In an exemplified method of this invention in FIGS. 6 to 9 manufacturing process of a safety pad corresponding to the above-mentioned traditional one is illustrated.

Figure 6:
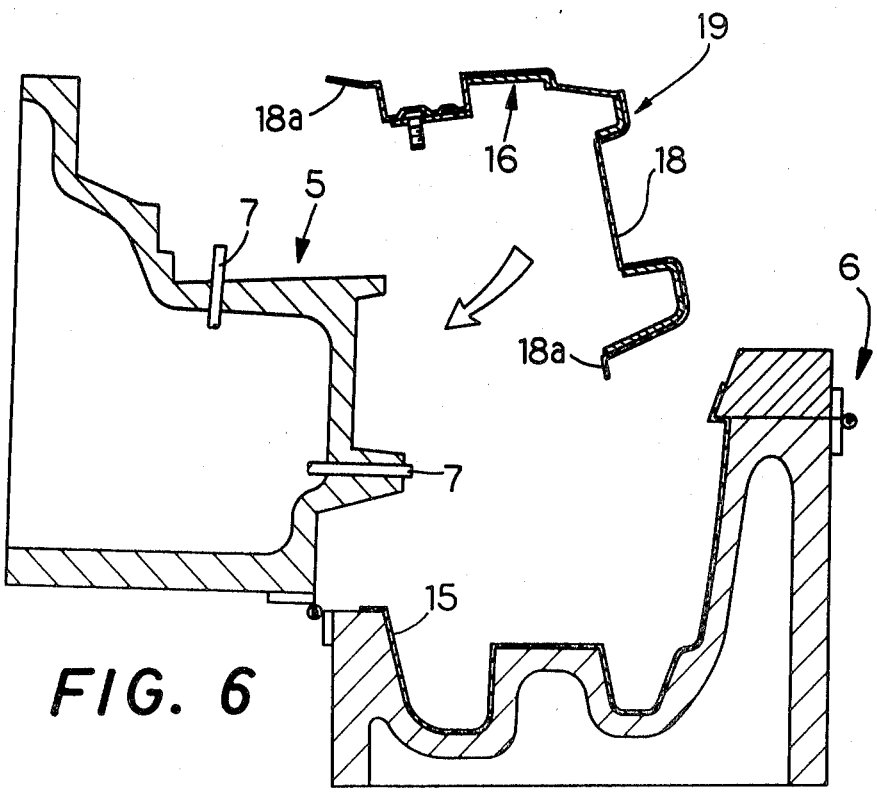
FIGS. 6 to 9 are respectively a vertical sectional view showing a manufacturing process of a safety pad in succession according to this invention.

In a similar way to the prior art, a mold consisting of a core block 5 and a cavity block 6 is being open as shown in FIG. 6, and a skin sheet 15 of a synthetic resin material such as polyvinylchloride resin, which is preformed into a predetermined shape by vacuum forming or the like method, is set at first in the cavity block 6. An insert 16 to be set in the core block 5 is however provided with a film 18 adhered on one side thereof where a foam layer 17 is expected to be formed with an adhesive or something. This film 18 is made of a synthetic resin such as rigid polyvinylchloride resin, ABS resin, polystyrene, etc. having a predetermined thickness, being generally in the order of 0.03–1.0 mm and sometimes as thick as 2 mm. It is also formed beforehand so as to cover the insert 16 by a vacuum forming method, for example, by being adhered thereon, and a skirt portion 18a thereof is formed longer outwardly beyond the outer edge of the insert 16 by a predetermined length (width) and extended along the outline of the core block 5. As for the formation of the film 18 on the surface of the insert 16 various other ways are permissible so long as the surface of the insert 16 can be well covered by the film 18, for example, sticking a separately made film thereon with an adhesive, fusing adherence of the film 18 by heat or the like, spraying of a resin solution over the surface of the insert 16, immersing of the insert 16 into a resin solution, etc. The insert 16 and the film 18 thus covering the insert 16 constitute an insert assembly 19 as shown in FIG. 6.

Figure 7:
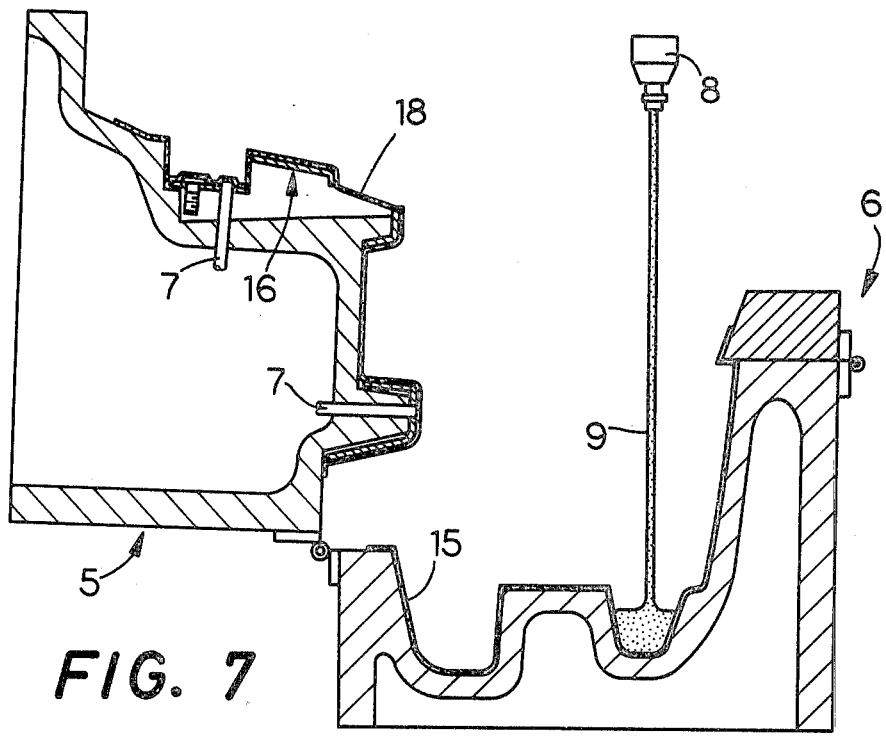
Figure 8:
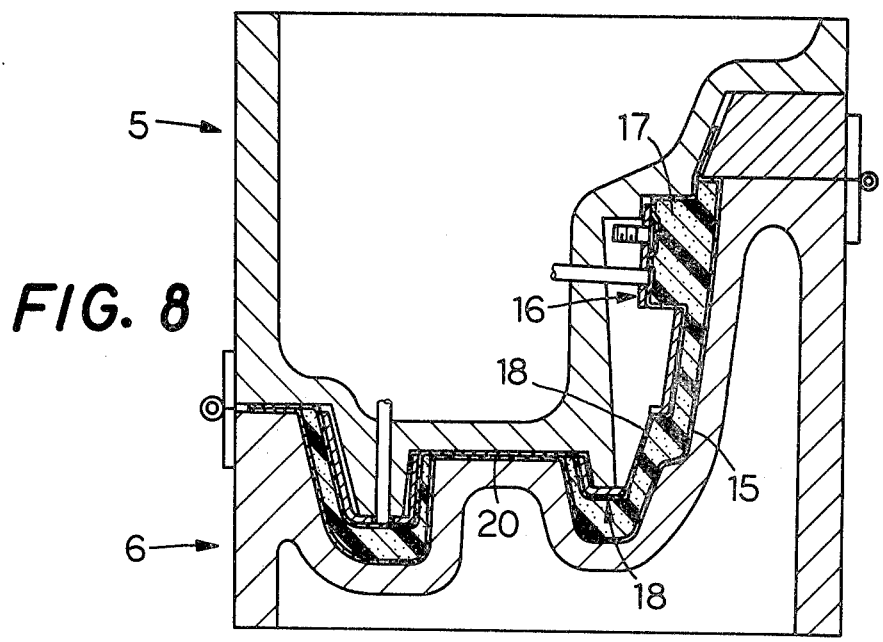
Figure 9:
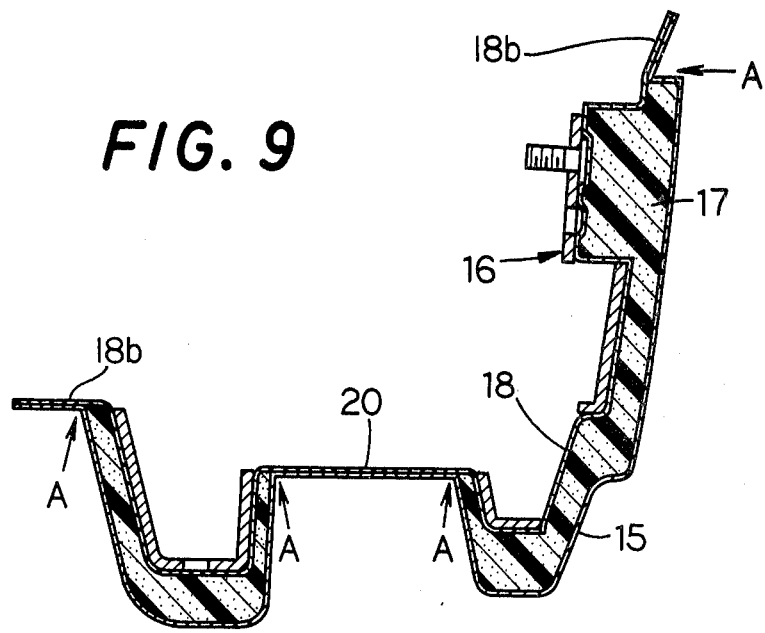

The insert assembly 19 prepared in this way is set on the core block 5 with a detachable pin 7 (see FIG. 6 and FIG. 7 such that the film 18 covers the surface of the core block 5). The insert 16 is thus set on the core block 5 in the covered status by the film 18, which signifies that all of the bolt holes, the forming hole, the opening, and the outer edge of the insert 16 are completely covered by the film 18. When the core block 5 and the cavity block 6 are, after the pouring of the foamable material such as polyurethane forming composition into the mold from the mixing head 8, closed together the skirt portion 18a of the film and the external edge of the skin sheet 15 are pinched together at the uniting portion of the two blocks (5, 6). Contacting place between the insert 16 and the core block 5 is also covered by the film 18 in this instance.

After the mold clamping of this mold in such a status, it is put in an oven for performing the foaming process by being maintained under a temperature of 40°–60° C., for example. In the course of this process the foamable material 9 is foamed between the film 18 and the skin sheet 15 within the mold. The foaming is performed exclusively on one side of the insert 16, with the film 18 being kept between the insert 16 and the skin sheet 15, so as to form the expected foam layer 17 there. In this process ingress of the foamable material 9 to the back side of the insert 16, through various holes formed in the insert 16, such as the bolt holes, the forming hole, the opening, etc., or a gap imaginable between the outer edge of the insert 16 and the core block 5, has been completely eliminated. It ensures perfect foaming of the poured foamable material 9, bringing about uniform foaming and expelling the production of holes or hollow spaces, ununiform strength of the foam layer due to ununiform foaming. The ratio of inferior articles has been reduced to the minimum by means of completely solving the problem of deformed and unsightly articles.

The way of taking out of the foamed articles from the mold is similar to the traditional one, and all that has to be done here is to cut off an extension 18b, that is including skirt portion 18a of the film 18 and skin sheet 15, at a base or foot portion A thereof, and to remove a part of the film 18 and the skin sheet 15 corresponding to the opening portion 20. A finished article shown in FIG. 10 can be obtained simply by the above-mentioned process without applying any additional troublesome step such as burr removing.

As the foam molding is performed in the method of this invention under such a condition that the insert 16 set on the core block 5 is being covered by the film 18 and particularly that various holes formed in the insert 16 and a gap possibly created at the outer edge of the insert 16 are being covered by the film 18, the formation of the foam layer 17 is carried out, with the film 18 being sandwiched inbetween, which perfectly prevents the foamable material such as polyurethane premix composition from going by leakage into the back side of the insert 16. It makes possible to completely eliminate the production of inferior articles due to the above-mentioned ununiform foaming which is liable to cause hollow spaces or ununiform strength of the products. Other merits expected from this method can be numerated as follows: elimination of unnecessary labor spent in removing the burrs which was a great problem in the prior art, particularly burr removing from the bolt(s) and the bolt hole(s) used for attaching the insert 16 to a counterpart thereof, elimination of adhering of the insert 16 to the core block 5 owing to the leaked foamable material 9 thereto, which permits the mold release agent to be dispensed not only eliminate the coating operation of the agent because of greatly improved mold releasability.

In some articles such as glove compartment doors where good appearance is required even on the back side thereof to the same extent as on the front side, it is possible to leave the back side of the insert 16 as the back side of the finished article without applying any finishing touch, which accompanies various merits, for example, elimination of the traditionally practiced specific back-cover thereto, labor and cost reduction caused thereby, and prevention of weight increase of the articles.

Other by-effects expected from the invented insert 16, because of its function performed by the interposed film 18 as a structural layer between the foam layer 17 and the insert 16, are contributions to improving flexibility and strength against breakage of the article and to preventing functional deterioration of the insert 16 such as strength degradation due to transition of some components from the foamable material to the insert 16.

This invention should by no means be understood, based on the above-mentioned embodiment alone. Various modifications and alterations can be made by those skilled in the art within the spirit and scope of the invention. For example, other known materials for foaming are permitted than the polyurethane forming composition used in the embodiment; the skin sheet 15 separately prepared beforehand, which is later integrally adhered to the surface of the foam layer 17 at the time of foam molding, can be replaced by a known foam molding method, called skinless method, wherein a skin layer is formed simultaneously with the foaming operation on the surface of the foam layer. Besides, the film 18 is usually adhered to the insert 16 so as to wholly cover the same, but a portion of the film 18 corresponding to the opening portion 20 of the insert 16 is allowed to be left open, that is having an open portion there, because that portion is pinches between the core block 5 and the cavity block 6 under pressure together with the skin sheet 15 so that there is no fear of leakage of the foamable material even when a hole of a certain size may exist there.

Figure 10:
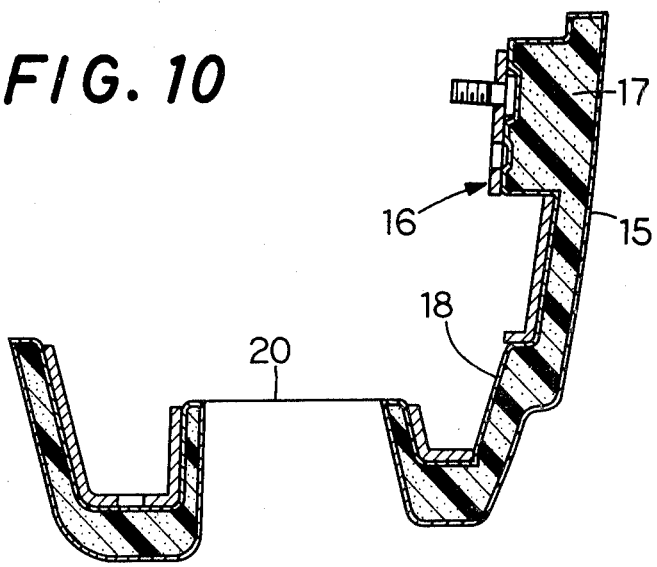
FIG. 10 is a vertical sectional view of a safety pad manufactured by a process or method according to this invention.

In the above-mentioned embodiment the film 18 is applied to the insert 16 before being set on the core block 5 to form the insert assembly 19, and this method of previously forming the film 18 is recognized as preferable from the view point of formation and adhesion of the film. This is however not only one limited method of forming the film 18. Adhesion and formation of the film 18 on an already set insert 16 is preferably practicable. In this instance, a film 18 may be made on an insert 16 set on a mold by means of plastering a ready made film, fusing a ready made film by heat or the like, or spraying a material thereor, so as to be adhered thereto. After the film has been formed or adhered by means of such methods on the insert, a finished article in FIG. 10 is obtained through processes illustrated in FIGS. 7-9.

Besides, the core block and the cavity block constituting a mold used in this invention may be respectively assembled of a plurality of parts, not being limited to a single unit part. In fact, the cavity block 6 in the previous example is constituted of two parts, although the core block 5 is a single unit part. The core block 5 may be similarly made of plural parts, and it is also permissible, contrary to the above, to form the cavity block 6 as a single unit part.

Figure 11:
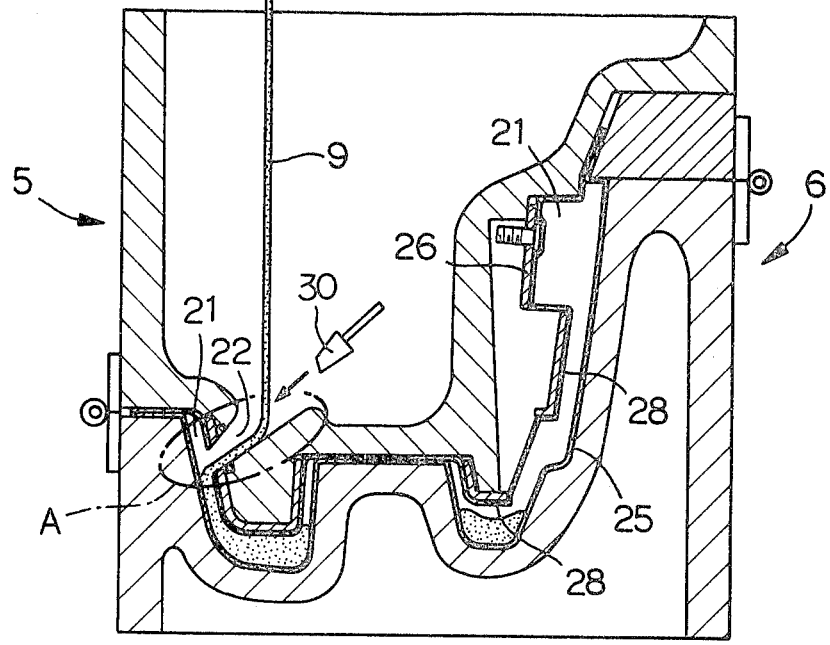
Figure 12:
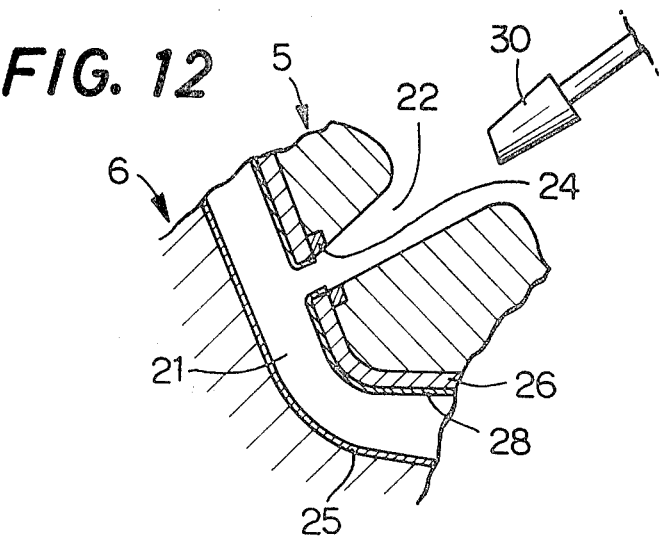
Figure 13:
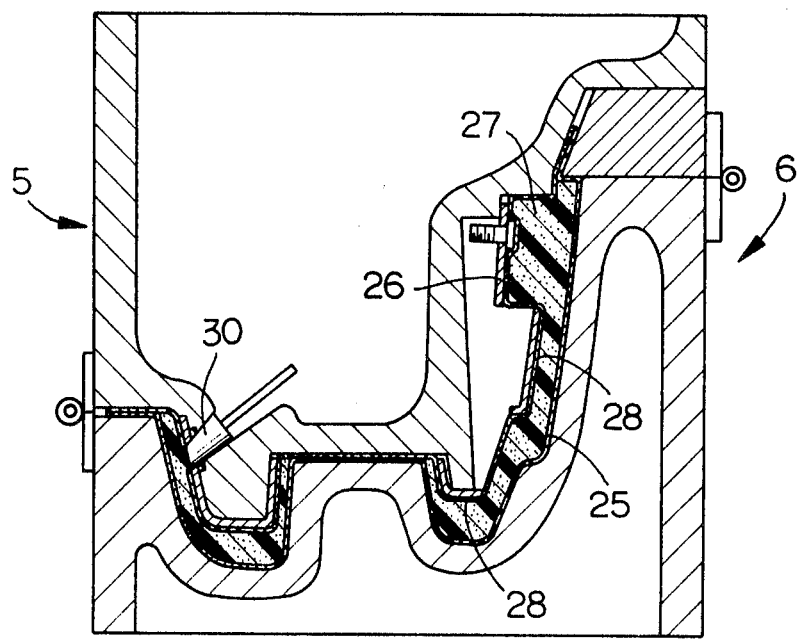

Contrary to the previous example wherein the insert 16 is set on the core block 5 facing the inner surface of the cavity, it is acceptable to set the insert 16 on the side of the cavity block 6, one example thereof being illustrated in FIGS. 11-13.

As can be seen in FIG. 11, a skin sheet 25, which has been made in advance in conformity with the shape of the inner surface of the cavity in the cavity block 6 along the outline thereof, is firstly set in the cavity block 6 such that the skirt portion of the skin sheet can be placed at the uniting portion of both blocks (5, 6) in sandwiched manner. Secondly, an insert 26 of a predetermined shape having on one side thereof a plastic film 28 adhered thereon is set in the cavity block 6 in such a posture as to leave a predetermined space, a foaming space 21 having the width corresponding to the thickness of the foam layer to be formed there, between the skin sheet 25 and thereto-faced film 28. Upon having set the skin sheet 25 and the insert 26 with the film 28 adhered thereon in the cavity block 6 in this manner, the core block 5 is placed on the cavity block 6 so as to cover the former for clamping the two blocks (5, 6). By this mold clamping the film 28 and the skin sheet 25 are both pinched or sandwiched at their respective skirt portion over the entire circumference thereof by the uniting portions of both blocks (5, 6), like in the previous example. Due to this mold clamping the foaming space 21 confined between the film 28 and the skin sheet 25 is closed to be like a bag.

Into this foaming space 21 formed between the film 28 and the skin sheet 25 as illustrated foamable material 9 is poured, after the mold clamping between the core block 5 and the cavity block 6, through a suitable number of pour-holes 22 bored in the core block 5. What a pour-hole 22 and its vicinity look like is illustrated in FIG. 12 in relation to the pouring of the foamable material 9. As can be seen in the drawing portions of the film 28 and the insert 26 just corresponding to the pour-hole 22 are respectively made into an opening so as to allow the foaming space 21 to be communicated with outside. Each of the pour-holes 22 is provided, on the inner circumferential surface portion thereof nearer to the insert 26, with a cushionable sealant member 24 made of, for example rubber or sponge, for the purpose of restraining ingress of foam-flash into a possible gap between the core block 5 and the insert 26 to the minimum.

When the pouring of the foamable material 9 is completed all of the pour-holes 22 are shut by a plug 30 respectively so as to leave the foaming process to be progressed as long as a desired foam layer 27 is integrally formed there between the film 28 and the skin sheet 25.

Foaming products thus obtained are subjected to some finishing process such as trimming, like in the previous example, to be final articles.

This system is particularly advantageous when an aimed foam molding is of large size requiring inevitably a large insert. That is because the difficulty of setting operation of a large size insert on the core block side for the molding operator.

What is claimed is:

1. A process for producing a foam molding including an insert of predetermined shape wherein the insert is set in a mold consisting essentially of a core block and a cavity block for foaming a foamable material in a cavity defined in said mold so as to form a foamed body on one side of said insert, said process comprising the steps of:
   preparing an insert assembly consisting of said insert and a film having portions adhering to a surface of said insert on said one side thereof, said film extending so as to match a partial profile of said foamed body and covering a surface of said core and cavity blocks, said film further having skirt portions adapted to extend between respective joining portion of said core and cavity blocks;
   setting said insert assembly on said one of the core and cavity blocks such that said skirt portions extend over the surface of said joining portion of the one block;
   enclosing said cavity by joining said core and cavity blocks such that said skirt portions are pinched by said joining portions; and
   pouring said foamable material into a space formed between said film and a surface of the other blocks to define said cavity.

2. A process for producing a foam molding including at least one insert of predetermined shape wherein the insert is set in a mold consisting of a core block and a cavity block for foaming a foamable material in a cavity defined in said mold so as to form a foamed body on one side of said insert, said process comprising the steps of:
   setting said insert on one of said core and cavity blocks;
   covering a surface of said one of the core and cavity blocks with a film having portions adhering to a surface of said insert on said one side thereof, said film extending so as to match a partial profile of said foamed body and further having skirt portions adapted to extend between respective joining portions of said core and cavity blocks, said insert and said film constituting an insert assembly;
   enclosing said cavity by joining said core and cavity blocks such that said skirt portions are pinched by said joining portions; and pouring said foamable material into a space formed between said film and a surface of the other block to define said cavity.

3. A process in accordance with claim 1 or 2, further comprising the step of setting a skin sheet on the surface of said other block before said foamable material is poured between said film and an inner surface of said skin sheet forming an outer shell of said foam molding.

4. A process in accordance with claim 1 or 2, further comprising the step of removing unnecessary parts of said film from the completed foam molding after the molding is released from said mold, said unnecessary parts including said skirt portions.

5. A process in accordance with claim 1 or 2, wherein said film is secured with adhesive to the surface of said insert on said one side thereof.

6. A process in accordance with claim 1 or 2, wherein said film is made of a synthetic resin and has a thickness not more than 2 mm.

7. A process in accordance with claim 1 or 2, wherein said film has a thickness in the range between 0.03 mm and 1.0 mm.

8. A process in accordance with claim 1 or 2, wherein said foamable material is a polyurethane premix composition and a foamed polyurethane body is formed on said one side of the insert due to foaming reaction of said polyurethane premix composition.

9. A process in accordance with claim 1 or 2, wherein said foamable material is poured into said cavity formed in said cavity block before said core block and said cavity block are joined and clamped together.

10. A process in accordance with claim 1 or 2, wherein said insert assembly including the film is set on the surface of said cavity block, said core block and said cavity block being subsequently joined together, and the foamable material being then poured into a foaming space formed between said film and said surface of the cavity block through at least one pour-hole bored in said core block.

* * * * *